United States Patent
Andrivet et al.

(10) Patent No.: US 6,327,132 B1
(45) Date of Patent: Dec. 4, 2001

(54) SPARK RESISTANT STRUCTURE, IN PARTICULAR FOR AIRCRAFT

(75) Inventors: Luc Andrivet, Antony; Jean-Pierre Avenet, Paris, both of (FR)

(73) Assignee: Aerospatiale Matra, Paris (FR)

( * ) Notice: Subject to any disclaimer, the term of this patent is extended or adjusted under 35 U.S.C. 154(b) by 0 days.

(21) Appl. No.: 09/402,640

(22) PCT Filed: Jun. 10, 1998

(86) PCT No.: PCT/FR98/01182

§ 371 Date: Oct. 8, 1999

§ 102(e) Date: Oct. 8, 1999

(87) PCT Pub. No.: WO98/58840

PCT Pub. Date: Dec. 30, 1998

(51) Int. Cl.[7] .................................................. H02G 13/00
(52) U.S. Cl. ..................... 361/218; 361/217; 361/212; 361/216; 361/117; 361/220; 244/1 A
(58) Field of Search ................................... 361/218, 117, 361/212, 220, 216, 217; 244/1 A

(56) References Cited

U.S. PATENT DOCUMENTS

| | | |
|---|---|---|
| 3,755,713 | 8/1973 | Paszkowski . |
| 3,989,984 | 11/1976 | Amason et al. . |
| 4,186,237 | 1/1980 | Propp . |
| 4,428,867 * | 1/1984 | Billias et al. ........................ 252/512 |
| 4,479,163 * | 10/1984 | Bannink, Jr. et al. ............... 361/218 |
| 4,502,092 * | 2/1985 | Bannink, Jr. et al. ............... 361/218 |
| 4,628,402 * | 12/1986 | Covey ................................... 361/218 |
| 4,630,168 * | 12/1986 | Hunt ..................................... 361/218 |
| 4,681,497 * | 7/1987 | Berecz ................................. 361/218 |
| 4,755,904 * | 7/1988 | Brick .................................... 361/117 |
| 4,888,451 * | 12/1989 | Toni et al. ......................... 174/94 R |
| 4,891,732 * | 1/1990 | Jones .................................... 361/218 |
| 4,912,594 * | 3/1990 | Bannink, Jr. et al. ............... 361/218 |
| 5,175,665 * | 12/1992 | Pegg .................................... 361/218 |
| 5,461,534 * | 10/1995 | Gondot et al. ...................... 361/218 |
| 5,709,356 * | 1/1998 | Avenet et al. ...................... 361/218 |

FOREIGN PATENT DOCUMENTS

| | | |
|---|---|---|
| 248122A2 | 12/1987 | (EP) . |
| 580417A1 | 1/1994 | (EP) . |

* cited by examiner

Primary Examiner—Fritz Fleming
Assistant Examiner—Miguel Quinones
(74) Attorney, Agent, or Firm—Stevens, Davis, Miller & Mosher, LLP

(57) ABSTRACT

Spark-resistant structure for use with aircraft, including a sheet-shaped external element made of a composite material with an exterior face bearing an electrically conducting surface layer for dissipating lightning energy. The external element also has an interior face. The structure further includes a sheet-shaped internal element with exterior and interior faces. The interior face of the external element is least partially superimposed on the exterior face of said internal element. Each element has holes which are aligned with each other. The structure also includes a fixing structure for holding the elements together in a fixed position passing through the aligned holes and forming an alignment. The fixing structure electrically contacts the conducting surface layer. Additionally, a first electrically conducting strip is positioned under the conducting surface layer of the external element, and it extends longitudinally in a direction of the alignment of the fixing structure. Moreover, the fixing structure passes through and makes an electrical contact with the first electrically conducting strip. The electrical contact between the fixing structure, as well as the electrical contact between the conducting surface layer and the conducting strip are both obtained by electrically conducting paste introduced into the holes in the external element.

10 Claims, 2 Drawing Sheets

SPARK RESISTANT STRUCTURE, IN PARTICULAR FOR AIRCRAFT

FIELD OF THE INVENTION

The present invention relates to a spark-resistant structure, particularly for aircraft.

BACKGROUND OF THE INVENTION

It is known that numerous parts of aircraft are now made of composite materials, particularly materials based on carbon fiber, and that in order to avoid these composite parts being destroyed, or at least damaged, in the event of lightning, electricity conducting means are provided for dissipating the energy of the lightning. Such electrically conducting means are generally conducting layers, for example made of metal mesh, latticework or fabric, arranged on the surface of said composite parts. Thus, the known spark-resistant structures, particularly for aircraft, generally comprise:

an external element, in the form of a sheet, made of a composite material and having an exterior face bearing an electrically conducting surface layer for dissipating lightning energy, and an interior face;

an internal element in the form of a sheet having an exterior face and an interior face, said external and internal elements being arranged in such a way that the interior face of the external element is at least partially superposed with the exterior face of said internal element, and being provided with holes which are aligned opposite each other; and fixing means passing through said aligned holes opposite each other and forming an alignment of fixing means for holding said elements together in a fixed position, said fixing means being electrically in contact with said conducting surface layer, for example by means of amounts of electrically conducting paste introduced into said holes of said external element, as described in document EP-A-0248122.

Thus, when lightning strikes said fixing means (metallic screws or rivets for example) the lightning current is transmitted to said electrically conducting surface layer, where it dissipates.

However, dissipation of energy of this kind assumes that there is good electrical contact between said fixing means and said conducting surface layer, because otherwise the lightning current causes damage to the structure, in the region of said fixing means and said internal and external elements. So, to ensure satisfactory electrical contact between the fixing means and said conducting surface layer, provision has already been made for the interposition of electrically conducting washers, for example made of foil, associated with each of said fixing means and whose task is to make sure that these fixing means make electrical contact with said surface conducting layer. However, the fitting and fixing of these washers are difficult, lengthy and complex operations which are further complicated by the fact that, in order for the exterior surface of the surface to be smooth, it is usual for said fixing means to have a countersunk head housed in countersinks made in the exterior face of said external element.

SUMMARY OF THE INVENTION

The use of such conducting washers is therefore expensive.

The object of the present invention is to overcome these drawbacks.

To this end, according to the invention, the spark-resistant structure mentioned hereinabove is noteworthy:

in that said external element comprises, under said conducting surface layer, an electrically conducting strip extending longitudinally in the direction of said alignment of the fixing means, through which strip said fixing means pass, and which is in electrical contact with said means; and in that the electrical contact between each of said fixing means and said conducting strip is obtained by means of said amount of electrically conducting paste introduced into the hole in said external element through which said fixing means passes.

Thus, because of the presence of said conducting strip and because of the use of amounts of a conducting paste which, for example, consists of an elastomer filled with conducting particles, for example made of aluminum or carbon, it is possible to avoid the use of the contact washers and the associated fitting operations mentioned hereinabove, while at the same time obtaining excellent protection against lightning. Lightning tests have demonstrated that the structure of the invention was able, without damage, to withstand lightning currents of the order of 150 to 200 kA. In addition, such a conducting paste also seals the structure at the fixing means and affords protection against corrosion of the galvanic type. The amount of electrically conducting paste introduced into said holes is sufficient to cover the entire shank of each fixing means.

Furthermore, it will be noted that said conducting strip may easily be incorporated into said external element, at its time of production.

As a preference, said electrically conducting strip extends transversely symmetrically with respect to said alignment of fixing means and has an electrical conductivity similar to that of said conducting surface layer.

In order to further improve the ability of the structure to dissipate lightning energy, said external element may comprise, under said conducting strip, at least one additional conducting strip extending longitudinally in the direction of said alignment of the fixing means, composite material.

Electrical contact between said additional conducting strip and said fixing elements may also be provided by the conducting paste.

As was the case with the conducting strip, it is advantageous for said additional conducting strip to extend transversely symmetrically with respect to said alignment of fixing means.

To facilitate implementation, it is preferable for the outline of said additional conducting strip to be vertically aligned with the outline of the conducting strip.

As a preference, at the opposite end to the free edge of said external element, the edges of said conducting strip and of said additional conducting strip protrude beyond a position of vertical alignment with the free edge of said internal element.

When, as is usual, said fixing means have a countersunk head, said conducting strip and said additional conducting strip are, just like the conducting surface layer, in contact with said countersunk heads.

In the structure according to the present invention, said internal element may be metallic, for example made of aluminum, or alternatively may be a part made of composite material.

The figures of the appended drawing will make it easy to understand how the invention may be carried out. In these figures, identical references denote similar elements.

DETAILED DESCRIPTION OF THE PREFERRED EMBODIMENT

Figure 1:
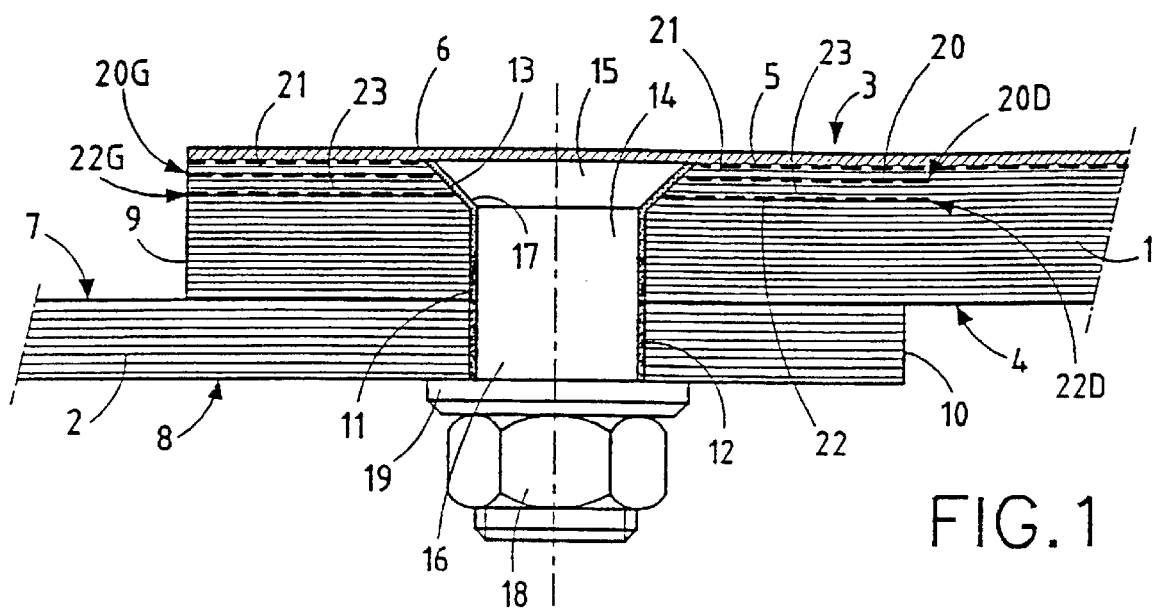
FIG. 1 is a cross section, passing through the axis of a fixing bolt, of a spark-resistant structure according to the present invention.
Figure 2:
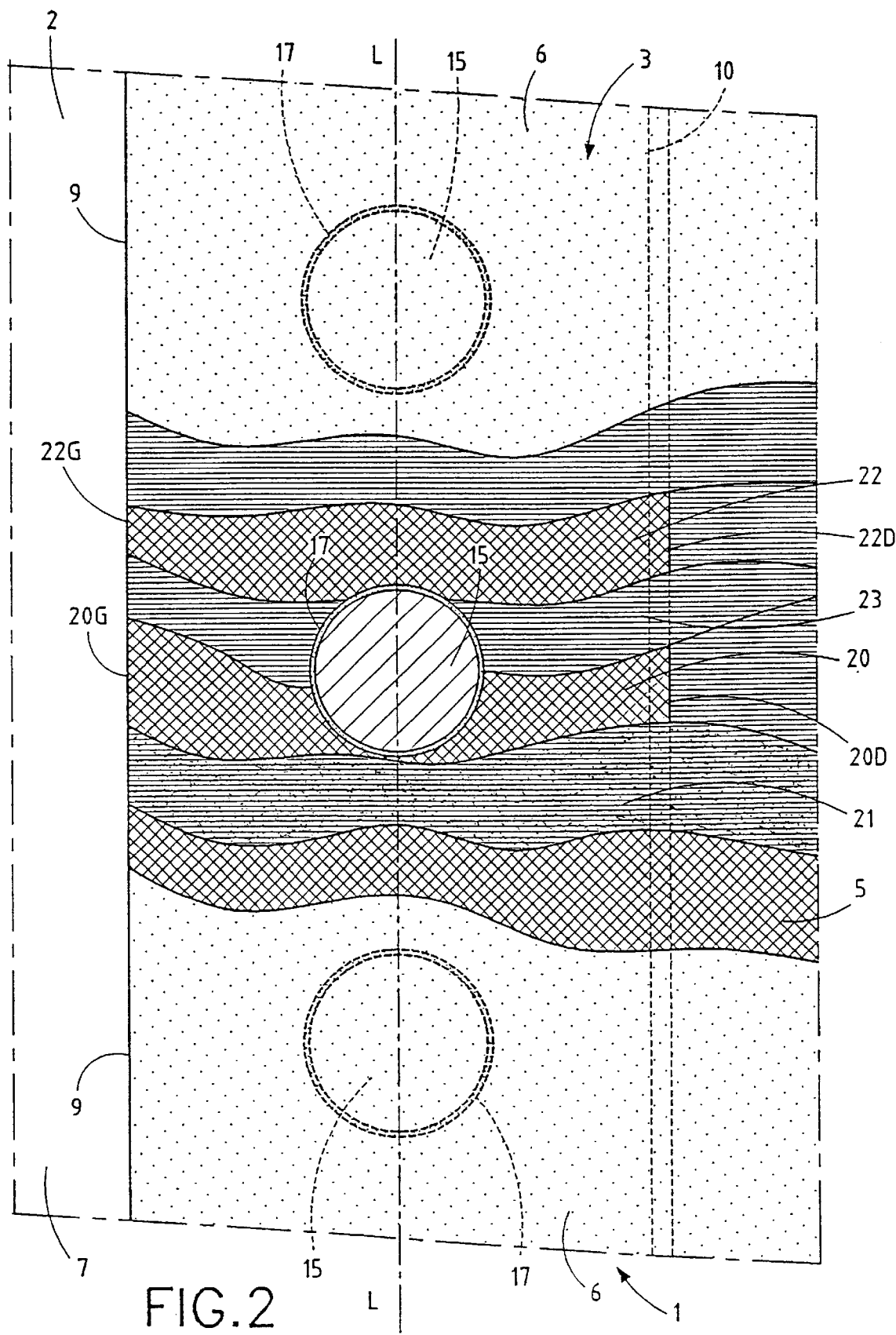
FIG. 2 is a plan view, with partial cutaway, of the spark-resistant structure of FIG. 1.

The spark-resistant structure according to the present invention and depicted in FIGS. 1 and 2 comprises two elements 1 and 2 in the form of sheets which partially overlap.

The external element 1 is made of composite material, for example based on carbon fiber, and has an exterior face 3 and an interior face 4. Said exterior face 3 bears, as is known, an electrically conducting surface mesh 5, for example of bronze wires, intended to dissipate lightning energy when lightning strikes the external element 1. The surface mesh 5, the mass of which may be of the order of 80 g/m$^2$, is itself covered with a protective layer of paint 6.

The internal element 2, which may be metallic or made of composite material, has an exterior face 7 and an interior face 8.

The elements 1 are 2 are superposed in such a way that the interior face 4 of the external element 1 at least partially covers the exterior face 7 of the internal element 2, in such a way that the edge 9 of the external element 1 is vertically aligned with said exterior face 7 of said internal element 2 and that the edge 10 of the internal element 2 is vertically aligned with said interior face 4 of said external element 1.

In their zone of overlap, said elements 1 and 2 are respectively provided with alignments of holes 11 and 12, said alignments being, for example, parallel to the edges 9 and 10 respectively. When said elements 1 and 2 are in their overlapping position of FIGS. 1 and 2, each hole 11 of the element 1 faces a hole 12 on the element 2.

Furthermore, on the exterior face 3 of the external element 1, each hole 11 is widened by a countersink 13.

A metallic screw 14 with a countersunk head 15 and an at least partially threaded shank 16 is introduced into each pair of holes 11, 12 facing each other. The countersunk heads 15 of the metallic screws 14 rest in the countersinks 13, with the interposition of an amount 17 of electrically conducting paste, and the shank 16 of each screw 14 collaborates with a nut 18. The nuts 18 bear, for example via washers 19, on the interior face 8 of the internal element 2, to press the countersunk heads 15 of the screws 14 into the countersinks 13 so that said elements 1 and 2 are held together in a fixed position, as depicted in FIGS. 1 and 2 and so that said countersunk heads 15 compress said amounts 17 of paste and cause the conducting paste to flow along the shank of the metallic screws 14. Thus, the surface conducting grating 5 is in electrical contact with the countersunk heads 15 of said metallic screws 14 via the electrically conducting paste 17.

The countersunk heads 15 are covered on the outside with the protective paint 6 and, as shown in FIG. 2, the screws 14 form an alignment of direction L—L.

According to the present invention, the spark-resistant structure of FIGS. 1 and 2 additionally comprises:

a first strip 20 of electrically conducting mesh, for example made of bronze wires and with a mass of 230 g/m$^2$, arranged under the surface mesh 5 and separated therefrom by a film of adhesive or resin 21 fixing said surface mesh in place, said first strip of mesh 20 extending longitudinally in the direction L—L of the alignment of metallic screws 14, having the latter passing through it and being in electrical contact with their countersunk heads 15 via the amounts 17 of electrically conducting paste; and a second strip 22 of electrically conducting mesh, for example made of bronze wires and with a mass of 80 g/m$^2$, arranged under the first strip of mesh 20 and separated therefrom by a thickness 23 of composite material, said second strip of mesh 22 extending longitudinally in the direction L—L of the alignment of metallic screws 14, having the latter passing through them and being in electrical contact with their countersunk heads 15 via the amounts 17 of electrically conducting paste.

Said first and second strips 20 and 22 extend transversely and symmetrically with respect to the alignment L—L of the screws 14. One of their longitudinal edges, 20G and 22G, respectively, lies flush with the edge 9 of the external element 1. Their opposite edges, 20D and 22D, respectively, are vertically aligned with one another and preferably protrude beyond a position of vertical alignment with the edge 10 of the internal element 2, extending further than this position of vertical alignment in the direction of the central part of the external element 1.

Figure 3:
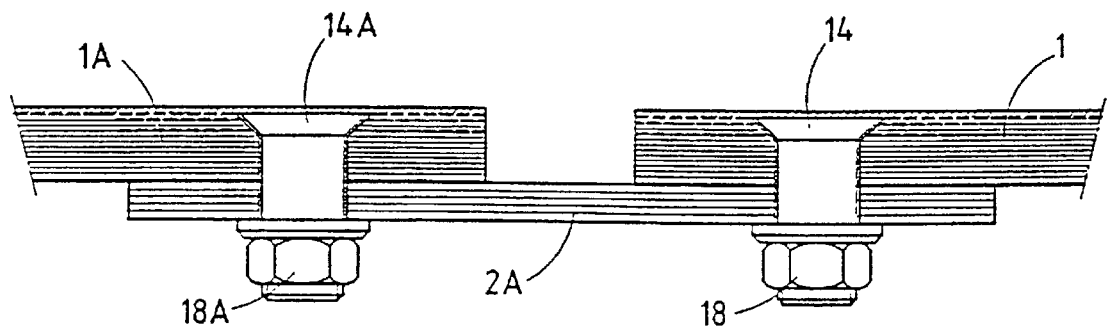
FIGS. 3 and 4 illustrate two applications of the structure of FIGS. 1 and 2.
Figure 4:
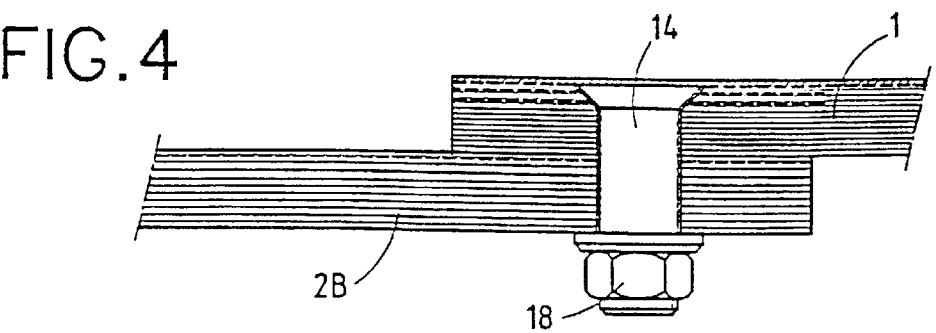

The internal element 2 may be metallic, for example made of aluminum. It may therefore act as a fishplate 2A for assembling the external element 1 with a similar element 1A, by means of fixing means 14, 18 and 14A, 18A (see FIG. 3).

This internal element 2 may, as an alternative, itself be a composite element 2B assembled with the external element 1 using the fixing means 14, 18.

What is claimed is:

1. A spark-resistant structure comprising:

an external element, in the form of a sheet, made of a composite material and having an exterior face bearing an electrically conducting surface layer for dissipating lightning energy, and an interior face;

an internal element, in the form of a sheet, having an exterior face and an interior face, said external and internal elements (i) being arranged in such a way that the interior face of the external element is at least partially superimposed on the exterior face of said internal element, and (ii) being provided with holes which are aligned opposite each other; and fixing means passing through said aligned holes opposite each other and forming an alignment of fixing means for holding said elements together in a fixed position, said fixing means being electrically in contact with said conducting surface layer by means of amounts of electrically conducting paste introduced into said holes of said external element, wherein:

said external element comprises, under said conducting surface layer, an electrically conducting strip extending longitudinally in a direction of said alignment of the fixing means, through which strip said fixing means pass, and which is in electrical contact with said means; and the electrical contact between each of said fixing means and said conducting strip is obtained by means of said amount of electrically conducting paste introduced into the hole in said external element, through which said fixing means passes.

2. The structure according to claim 1, wherein said electrically conducting strip extends transversely symmetrically with respect to said alignment of said fixing means.

3. The structure according to claim 1, wherein said electrically conducting strip has an electrical conductivity similar to that of said conducting surface layer.

4. The structure according to claim 1, wherein said electrically conducting strip comprises a first conducting strip and said external element comprises, under said first conducting strip, a second conducting strip extending longitudinally in the direction of said alignment of the fixing means, said fixing means passing through said second conducting strip, said second conducting strip being in electrical contact with said fixing means and separated from said first conducting strip by a thickness of a composite material.

5. The structure according to claim 4, wherein said second conducting strip extends transversely symmetrically with respect to said alignment of said fixing means.

6. The structure according to claim 4, wherein an outline of said second conducting strip is vertically aligned with an outline of the first conducting strip.

7. The structure according to claim 4, wherein, at an opposite end to a free edge of said external element, edges of said first conducting strip and of the second conducting strip protrude beyond a position of said vertical alignment with a free edge of said internal element.

8. The structure according to claim 4, in which said fixing means have countersunk heads housed in countersinks made in the exterior face of the external element, wherein said conducting surface layer and said first and second conducting strips are in contact with said countersunk heads.

9. The structure according to claim 1, wherein said internal element is metallic.

10. The structure according to claim 1 wherein said internal element is made of a composite material.

* * * * *